(12) United States Patent
Bailey et al.

(10) Patent No.: US 11,063,985 B2
(45) Date of Patent: *Jul. 13, 2021

(54) METHODS AND APPARATUS FOR GRAPHICAL USER INTERFACE ENVIRONMENT FOR CREATING THREAT RESPONSE COURSES OF ACTION FOR COMPUTER NETWORKS

(71) Applicant: FireEye, Inc., Milpitas, CA (US)

(72) Inventors: Christopher Nelson Bailey, Adamstown, MD (US); Bernd Constant, Arlington, VA (US); Juan Manuel Vela, Woodbridge, VA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,990

(22) Filed: Dec. 18, 2019

(65) Prior Publication Data

US 2020/0314146 A1    Oct. 1, 2020

Related U.S. Application Data

(62) Division of application No. 15/190,028, filed on Jun. 22, 2016, now Pat. No. 10,536,484.

(Continued)

(51) Int. Cl.
  *H04L 29/06*     (2006.01)
  *G06F 21/55*     (2013.01)
  (Continued)

(52) U.S. Cl.
  CPC ............ *H04L 63/20* (2013.01); *G06F 3/0482* (2013.01); *G06F 3/04842* (2013.01);
  (Continued)

(58) Field of Classification Search
  CPC ... H04L 63/20; H04L 63/0236; G06F 21/554; G06F 21/57
  (Continued)

(56) References Cited

U.S. PATENT DOCUMENTS 5,966,441 A    10/1999   Calamera
6,243,863 B1 *  6/2001   Kothari .................. G06F 8/456
                                                717/144

(Continued)

FOREIGN PATENT DOCUMENTS

WO    WO-2009/047113 A1    4/2009

OTHER PUBLICATIONS

Reed, Theodore, et al.; "Simulation of Workflow and Threat Characteristics for Cyber Security Incident Response Teams", 2014; Proceedings of the Human Factors and Ergonomics Society Annual Meeting, pp. 1-7 (Year: 2014).*

(Continued)

*Primary Examiner* — Yin Chen Shaw
*Assistant Examiner* — Angela R Holmes
(74) *Attorney, Agent, or Firm* — Cooley LLP

(57) ABSTRACT

A graphical user interface provides network security administrators a tool to quickly and easily create one or more courses of action for automatic response to a network threat. The courses of action are hardware and system agnostic, which allows a common response task to be implemented by an underlying response engine for any or multiple similar-function devices regardless of brand or version. The course of action builder allows the administrator to use a simple, graphic-based, business modeling concept to craft and design security response processes rather than having to hard code response routines specific to each piece of hardware on the network. The graphic interface model allows the user of the threat response software incorporating the course (Continued)

of action builder to easily understand the overall flow and paths the response may take, as well as understand the data requirements and dependencies that will be evaluated.

26 Claims, 11 Drawing Sheets

Related U.S. Application Data

(60) Provisional application No. 62/183,097, filed on Jun. 22, 2015.

(51) Int. Cl.
| | | |
|---|---|---|
| *G06F 21/57* | (2013.01) | |
| *G06F 3/0482* | (2013.01) | |
| *G06F 3/0484* | (2013.01) | |
| *G06T 11/20* | (2006.01) | |
| *G06F 3/0483* | (2013.01) | |
| *G06F 3/0486* | (2013.01) | |

(52) U.S. Cl.
CPC ............ *G06F 21/554* (2013.01); *G06F 21/57* (2013.01); *G06T 11/206* (2013.01); *G06F 3/0483* (2013.01); *G06F 3/0486* (2013.01); *H04L 63/0236* (2013.01); *H04L 63/14* (2013.01)

(58) Field of Classification Search
USPC .......................................................... 726/1
See application file for complete search history.

(56) References Cited

U.S. PATENT DOCUMENTS

| | | | |
|---|---|---|---|
| 8,176,554 B1 | 5/2012 | Kennedy | |
| 8,245,302 B2 | 8/2012 | Evans et al. | |
| 8,631,330 B1 | 1/2014 | Hwang et al. | |
| 8,688,790 B2 | 4/2014 | LeVasseur et al. | |
| 9,276,946 B2 | 3/2016 | Coates et al. | |
| 9,787,714 B2 | 10/2017 | Bach | |
| 10,129,290 B2 | 11/2018 | Thomas et al. | |
| 10,505,972 B2 | 12/2019 | Thomas et al. | |
| 10,536,484 B2 | 1/2020 | Bailey et al. | |
| 10,616,265 B2 | 4/2020 | Thomas et al. | |
| 2002/0171546 A1 | 11/2002 | Evans et al. | |
| 2004/0019693 A1* | 1/2004 | Grow ................... G06F 16/258 709/232 | |
| 2004/0073782 A1 | 4/2004 | Price et al. | |
| 2005/0138425 A1 | 6/2005 | Kim et al. | |
| 2006/0074730 A1* | 4/2006 | Shukla ............... G06Q 10/0633 705/7.27 |
| 2006/0143686 A1 | 6/2006 | Maes | |
| 2006/0212932 A1 | 9/2006 | Patrick et al. | |
| 2007/0186284 A1 | 8/2007 | McConnell | |
| 2007/0255723 A1 | 11/2007 | Jung et al. | |
| 2008/0016569 A1 | 1/2008 | Hammer et al. | |
| 2008/0040191 A1 | 2/2008 | Chakravarty et al. | |
| 2008/0209505 A1* | 8/2008 | Ghai ....................... H04L 63/20 726/1 |
| 2009/0052329 A1 | 2/2009 | Mahajan et al. | |
| 2009/0070121 A1* | 3/2009 | Leonelli ................ G06Q 10/06 705/301 |
| 2010/0043066 A1 | 2/2010 | Miliefsky | |
| 2010/0050260 A1 | 2/2010 | Nakakoji et al. | |
| 2010/0100964 A1 | 4/2010 | Mahaffey et al. | |
| 2010/0138926 A1 | 6/2010 | Kashchenko et al. | |
| 2011/0039237 A1 | 2/2011 | Skare | |
| 2011/0154509 A1 | 6/2011 | Mostinski et al. | |
| 2011/0202995 A1 | 8/2011 | Markham | |
| 2011/0264608 A1 | 10/2011 | Gonsalves et al. | |
| 2011/0302291 A1 | 12/2011 | Draugelis | |
| 2011/0314546 A1 | 12/2011 | Aziz et al. | |
| 2012/0210265 A1 | 8/2012 | Delia et al. | |
| 2013/0081141 A1 | 3/2013 | Anurag | |
| 2013/0097662 A1 | 4/2013 | Pearcy et al. | |
| 2013/0097699 A1 | 4/2013 | Balupari et al. | |
| 2014/0082749 A1 | 3/2014 | Holland et al. | |
| 2014/0189435 A1* | 7/2014 | Manuel-Devadoss ...................... G06F 11/3495 714/43 |
| 2016/0065603 A1 | 3/2016 | Dekel et al. | |
| 2016/0078236 A1 | 3/2016 | Chesla | |

OTHER PUBLICATIONS

Extended European Search Report dated Apr. 28, 2017, for EP Application No. 14 850 557.1, filed on Oct. 2, 2014, 11 pages.
Extended European Search Report dated Jan. 8, 2019, for EP Application No. 16 815 237.9, filed on Jun. 22, 2016, 12 pages.
International Search Report dated Mar. 2, 2015, for PCT Application No. PCT/US2014/058909, filed on Oct. 2, 2014, 3 pages.
International Search Report dated Oct. 28, 2016, for PCT Application No. PCT/US2016/038809, filed on Jun. 22, 2016, 5 pages.
Javvin Network Management & Security (2007). Network Security Map, Second edition, ISBN 978-1-60267-001-3, 3 total pages.
Notice of Allowance dated Nov. 27, 2019, for U.S. Appl. No. 16/185,865, filed Nov. 9, 2018, 12 pages.
Written Opinion of the International Searching Authority dated Mar. 2, 2015, for PCT Application No. PCT/US2014/058909, filed on Oct. 2, 2014, 13 pages.
Written Opinion of the International Searching Authority dated Oct. 28, 2016, for PCT Application No. PCT/US2016/038809, filed on Jun. 22, 2016, 6 pages.

* cited by examiner

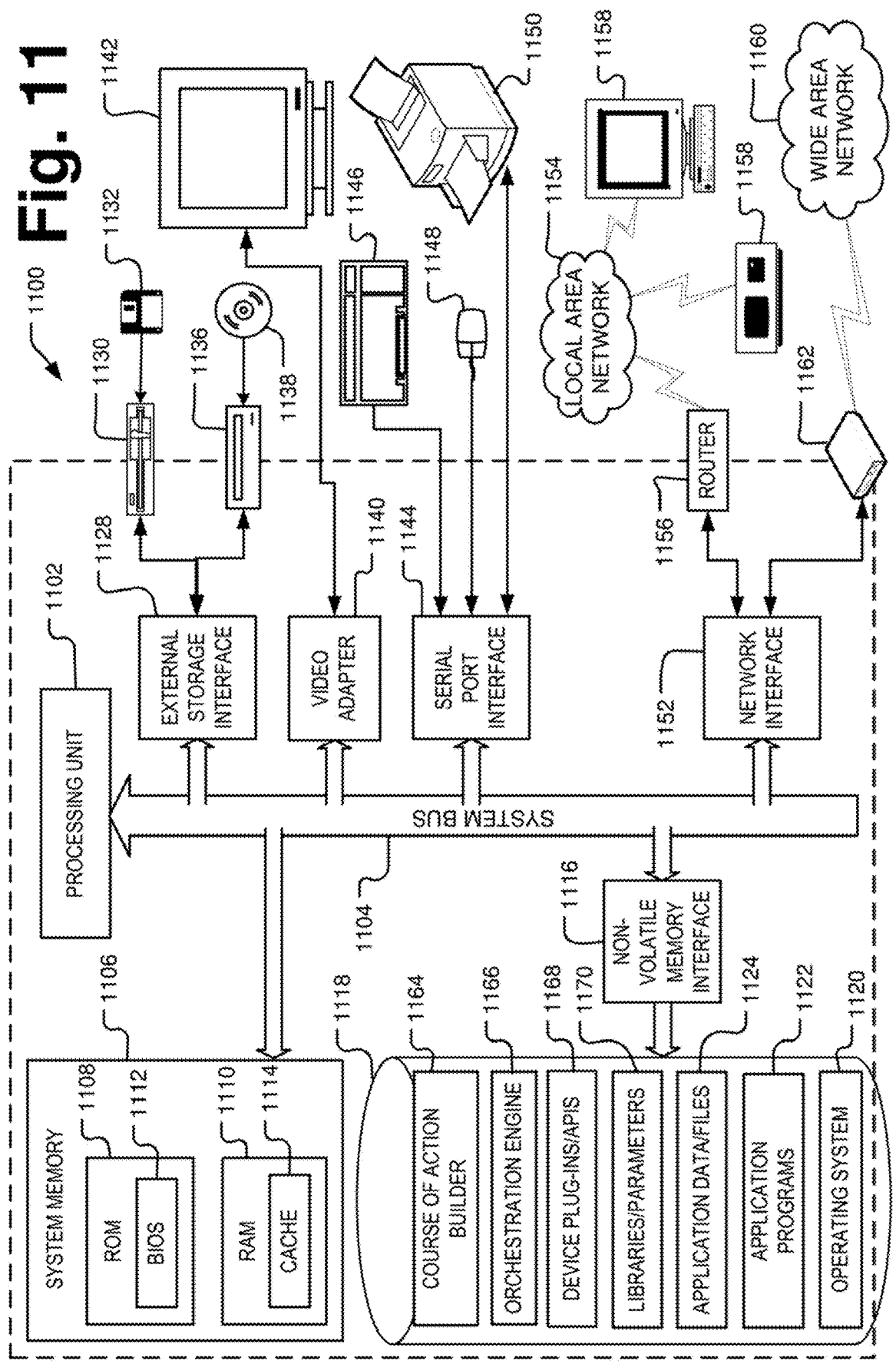

METHODS AND APPARATUS FOR GRAPHICAL USER INTERFACE ENVIRONMENT FOR CREATING THREAT RESPONSE COURSES OF ACTION FOR COMPUTER NETWORKS

CROSS-REFERENCE TO RELATED APPLICATION

This application is a divisional of U.S. patent application Ser. No. 15/190,028, filed Jun. 22, 2016 (now U.S. Pat. No. 10,536,484), entitled "Methods and Apparatus for Graphical User Interface Environment for Creating Threat Response Courses of Action for Computer Networks," which claims priority to U.S. Provisional Application No. 62/183,097 filed Jun. 22, 2015, and entitled "Methods and Apparatus for Graphical User Interface Environment for Creating Threat Response Courses of Action for Computer Networks," the disclosure of each of which is hereby incorporated herein by reference in its entirety.

TECHNICAL FIELD

The technology described herein relates to the creation of threat response actions within a computer network and, more particularly, to the use of a graphical user interface in the form of process workflow representation tools that are used to build response actions.

BACKGROUND

Cyber-security detection and response systems may be configured to aggregate and unify data from multiple devices, components, and platforms on a computer network. Security administrators often design and implement a standard operating procedure of device-actions taken by security individuals in response to a security incident. Based on the nature of a particular threat, the cyber-security system may initiate an action plan that is tailored to the security operations center and its operating procedures to protect potentially impacted components and network resources. The goal of cyber-security systems is to provide rapid and reliable, enterprise-wide threat responses, e.g., to mitigate threats, survive breaches, and maintain operations during attacks. To provide rapid responses, security administrators often program preconfigured response plans for implementation upon recognition of a cyber-security threat. The cyber-security system can thus provide system configuration instructions to defend against threats originating both external to and internal to the network. At present such specific threat response plans and related system configuration instructions must be individually coded by the security administrator. The coding in the response plan must also be specific to the hardware on the network of the enterprise to activate, deactivate, or otherwise reconfigure the hardware and other network systems to respond to the particular security threat identified.

The information included in this Background section of the specification, including any references cited herein and any description or discussion thereof, is included for technical reference purposes only and is not to be regarded subject matter by which the scope of the invention as defined in the claims is to be bound.

SUMMARY

The technology disclosed herein provides a graphical user interface through which users, generally network security administrators, can quickly and easily create one or more courses of action for automatic response to a network threat. The courses of action are hardware and system agnostic, which allows a common response task to be implemented by an underlying response engine for any or multiple similar-function devices regardless of brand or version. The course of action builder allows the administrator to use a simple, graphic-based, business modeling concept to craft and design security response processes rather than having to hard code response routines specific to each piece of hardware on the network. The graphic interface model allows the user of the threat response software incorporating the course of action builder to easily understand the overall flow and paths the response may take, as well as understand the data requirements and dependencies that will be evaluated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 4 is an exemplary screenshot of an interface for defining input parameter values specific to a command implemented by a network device plug-in.

FIG. 11 is schematic diagram of a special purpose computer configured to implement a course of action builder module for building a course of action for an automated network security threat response.

DETAILED DESCRIPTION

Figure 1:
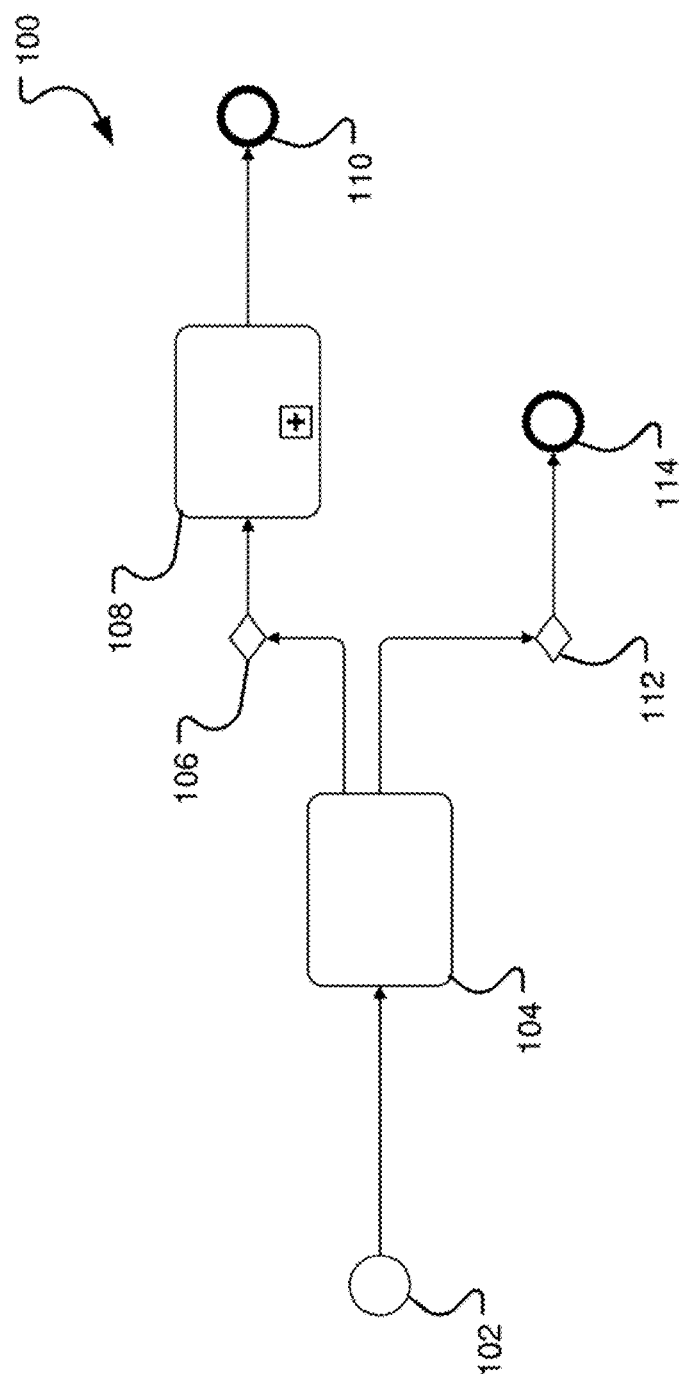
FIG. 1 is a schematic diagram of an exemplary course of action representation built in a graphical user interface for creating automated network security threat response action protocols.

A cyber-security response system is provided that allows a user to agnostically configure appropriate threat responses by multiple devices, components, and platforms on a computer network. Security administrators can utilize the solution to design and implement a workflow of device-actions to be automatically implemented in response to a security incident. Based on the nature of a particular threat, the cyber-security response system may initiate an action plan that is tailored to the security operations center (SOC) and its operating procedures to protect potentially impacted components and network resources. Upon recognition of a cyber-security threat, through preconfigured activation workflow plans, the cyber-security system automatically provides system configuration instructions to defend against threats originating both external to and internal to the network.

Users can create courses of action (CoA) in cyber security terms using a CoA Builder module that leverages representational elements in a graphical user interface (GUI). A course of action can be represented in the GUI as a workflow or a sequence of tasks can be generated by the workflow. A CoA response may be built via an intuitive GUI that provides drag and drop base elements in combination with configuration features that transform the graphic elements into specific command or task representations linked to implementable instructions to control devices on the network. Particular network devices are identified during build-out of the CoA and are associated with device plug-ins. The device plug-ins are built to interact with the specific application program interface (API) of the network device and are configured with specific activation routines that can activate or configure the network device in ways that are helpful to blocking or remediating a network security threat. The device plug-ins receive device configuration information from the CoA, identify input parameter information necessary to control the particular device to perform a specific task or action, and identify output information generated by the device when performing the action. Once built in the GUI, a CoA visually depicts the flow of tasks (also referred to herein as "workflow") that can occur when a particular cyber security event occurs and allows users to manage the event response.

The tasks represented in the CoA are implemented in response to a threat event by a separate but integrated application layer of the cyber-security response system referred to herein as the "Orchestration Engine." The Orchestration Engine executes the instructions identified by the CoA when processing inbound events to automatically remediate threats. The Orchestration Engine reads the tasks in the CoA, calls on the particular plug-ins associated with network devices identified in the CoA task to provide device-specific action instructions, passes the necessary input and output parameters to and from the CoA, the plug-ins, and the devices, and processes the CoA workflow in the designed order.

As noted, each CoA is device and platform agnostic. For example, the CoA may be represented in extensible markup language (XML) and the XML file for a CoA defining a response to a threat can be shared from one organization to another that also have a compatible cyber-security response system. While the response management system needs to be compatible, the network configuration and devices thereon can be entirely different between organizations, and the CoA can still work. For example, one organization may have two firewall components while a second organization has ten firewall components. The firewall devices may be made by different manufacturers. The CoA can generically state that the task is to activate or configure a firewall in a certain way. The underlying Orchestration Engine can thus recognize which device plug-ins correspond to firewall devices that have been registered with the cyber-security response system and then use the values in the generic input parameters received from the CoA to configure the plug-ins to actuate the devices and manage the threat response.

Organizations can create a library of courses of actions (actionable workflows, sequence of actions, or sequence of tasks) so processes are centrally managed and executed in a high-confidence, repeatable fashion via a graphical user interface. Such a library may be maintained as a repository of automated response procedures that can be updated at any time. This gives organizations a single place to go to update a process where it can take effect with zero variation due to it being automated. Any CoAs within a library can be consumed by the Orchestration Engine and automatically executed as soon as they are updated. This leaves zero lag time between the implementation or update of a process and the execution of it. A benefit of a CoA library is that effective threat response processes can be stored to reduce loss of human created know-how when human resources leave. This allows organizations to maintain up-to-date processes in the ever changing landscape of cyber threats. Normalization of data and presentation of threat response processes via a GUI to the user in easily understandable terms allows for ease of management and deployment of threat response actions and reduction in time spent setting up processes. The CoA Builder GUI also allows for more expedient onboarding of new human resources as they can understand the processes faster.

An exemplary, generic course of action workflow for a threat response that may be designed in the CoA Builder module is depicted in FIG. 1. The CoA 100 is built using a graphical user interface. The purpose is to detail the sequence of tasks necessary for a threat response and make references to the plug-in and calls to its components needed for the desired device action. The CoA may be stored as a JavaScript Object Notation (JSON) object or other similar data-interchange format. The CoA does not store code, but instead stores references to the plug-in data and maintains the sequence, order, and conditions by which each task is executed. The CoA 100 also records what input parameters are available based on the tasks chosen and displays the possible output parameters of those tasks based on the existing references to the plug-in data.

The start node 102 of any given CoA 100 is intended to serve as a trigger event. The trigger event is used to create context around the CoA 100 since the sequence of steps is in response to the inbound event. The start node 102 can ask the user to select an "adapter." The adapter could be anything that would serve as the source of the event requiring response, such as an email, or a sys.log message from a security information and event management (SIEM) application. The user can create a trigger condition associated with the start node 102, which is an evaluation of the incoming data. If the condition is met, the CoA 100 can execute. If the condition is not met, the CoA 100 cannot execute. The trigger condition serves as the business justification for execution of the CoA 100. A specific adapter can be the start node 102 of more than one CoA 100.

The second step to configuring the start node 102 is to select the specific output parameters from the adapter that you wish to make available to the downstream tasks in the CoA 100. Since the instantiation of the adapter in a particular CoA 100 is specific to the trigger condition, the user may also select any data elements considered important for the particular CoA 100 to output as output parameters. This can be contextually different for each CoA into which the adapter is incorporated since the instantiation of the particular CoA is specific to the trigger condition. The output parameters can be selected in the CoA building process. The result of this step is the definition of trigger or start conditions and output parameters from the adapter event.

Once the start node 102 is configured, one or more tasks 104 are then configured to build the workflow of the CoA 100. Configuration of a task 104 involves selecting the following: a device plug-In, a command, and input parameters for the command. By selection of the plug-in to perform the task on, the CoA Builder application knows the available devices due to a reference provided in a device table. Plug-in and device registration can be described in detail later herein in association with FIGS. 3-5. Using the plug-in registration information, the associated commands are then presented to the user to select. Once the user selects the command to execute, the plug-in registration information is once again called to provide prompts for the user to enter the input parameters into the task 104. The CoA Builder may allow the user to input the required input parameters by either selecting from the available ones output from an upstream adapter or task 104. Alternatively, the CoA Builder may allow the user to create a custom parameter value with operators such as "begins with," "contains," etc. This provides the flexibility to define a parameter not previously pulled in the workflow, or define something "hard coded" rather than variable. Once the input parameters have been selected, the configuration of the task 104 is complete. The output parameters are automatically output and made available to the downstream CoA tasks so they may also consume or evaluate them.

The CoA 100 may additionally include decision points 106, 112 in paths of the flow to determine whether additional tasks in the workflow should be performed or to choose between alternate tasks. Configuration of a decision point 106, 112 works similarly to a task 104, except that a specific plug-in is not input. The decision point 106, 112 is used to perform an evaluation to determine if the path should continue. Configuration of the decision point 106, 112 also utilizes the graphical user interface to allow the user to construct a conditional statement that can be evaluated to be true or false. For example, if a parameter value is "true," the path may continue; alternatively, if a parameter value is "false," the path may not continue. Any data that has been output from start node 102 or task 104 can be available for evaluation.

Sub-processes 108 can also be incorporated in to CoA 100. This provides the ability to maintain a highly repeatable sequence of tasks and add it in to another CoA without having to recreate it multiple times or maintain multiple instantiations of the same sequence. When a sub-CoA 108 is first created, specific input parameters for the sub-CoA 108 are also defined. When the sub-CoA 108 is incorporated in to a parent CoA 100, those input parameters from the parent CoA 100 can be mapped similarly to a task 104 so all the individual tasks within that sub-CoA 08 can run. A sub-CoA 108 can be designed to run either as an automated action sequence or to run when manually initiated by a user. The latter may require an approval step within a separate authorization tool whereby the sub-CoA 108 can be "recommended" to run and the user may choose to activate it by clicking on it.

End points 110, 114 simply define the end of the CoA 100 and signal to the Orchestration Engine that no further tasks need to be performed.

Figure 2:
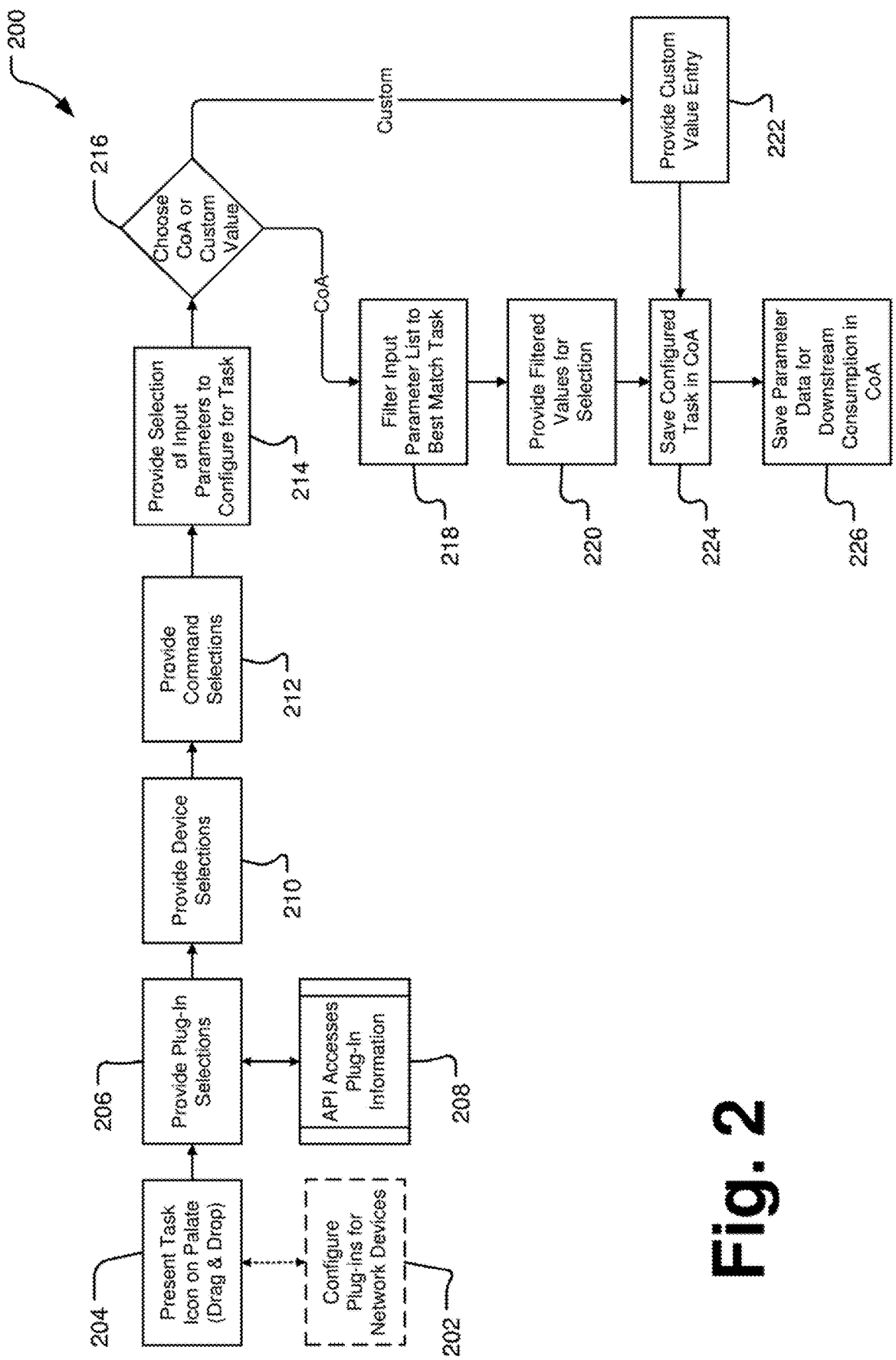
FIG. 2 is a flow diagram of a process implemented through a graphical user interface for building a course of action for an automated network security threat response.
Figure 3:
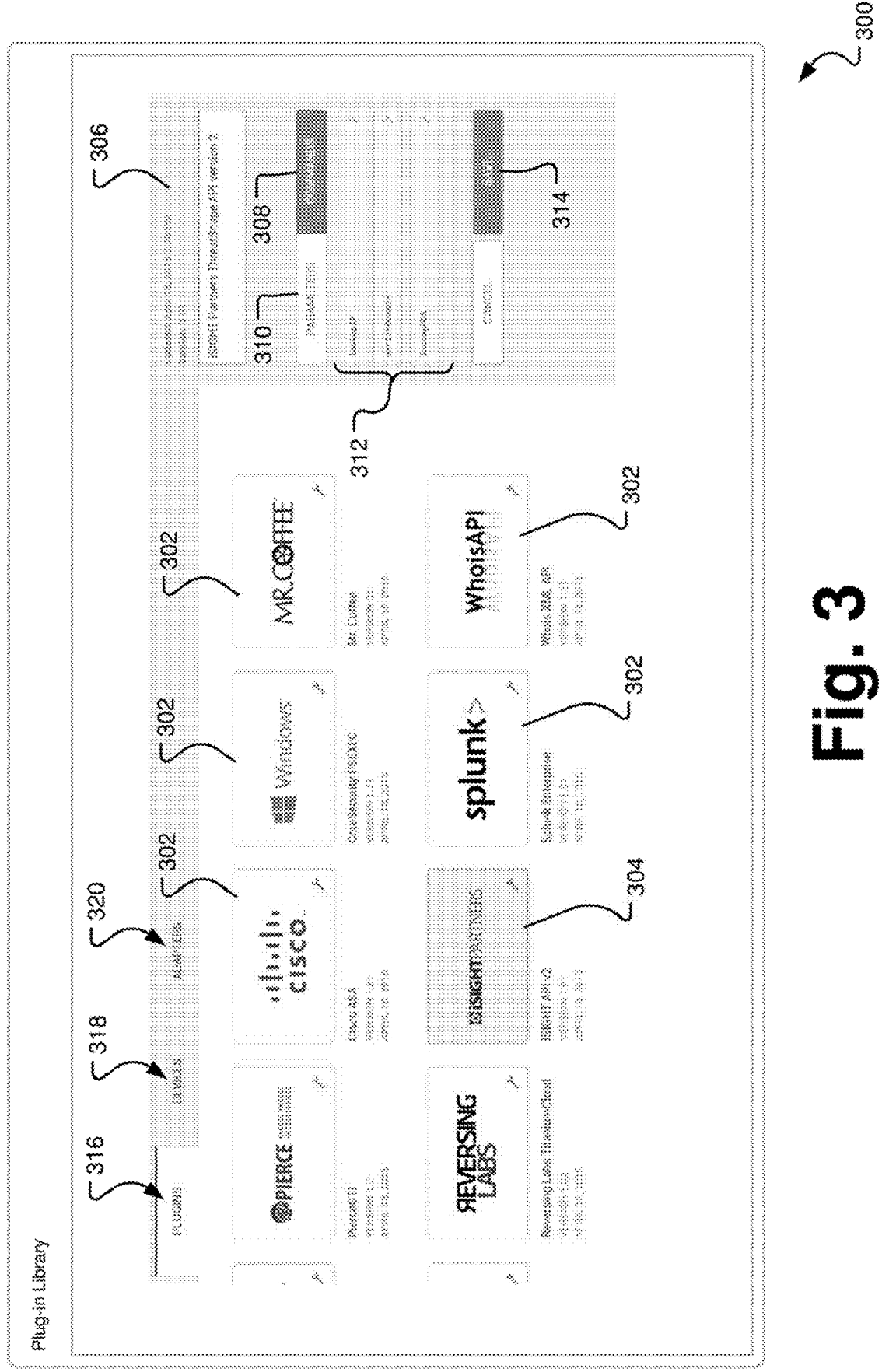
FIG. 3 is an exemplary screenshot of a plugin interface within a course of action builder for selection of available network device plugins and registration with network devices.

FIG. 2 depicts an exemplary process 200 for allowing a user to configure a CoA using the CoA Builder GUI tools. The steps in FIG. 2 can further be explained with reference to FIGS. 3-9. A preliminary step 202 in configuring a CoA is to register and appropriate device plug-ins within the cyber-security response system that correspond to network components or appliances on the network to be protected. As shown in the screenshot of FIG. 3, a library 300 with a section 316 for device plug-ins 302 may be provided as part of CoA Builder platform.

A plug-in 302 (or connector) is an integration to a third party product (device) that is used to either extract information or modify a policy. Plug-ins 302 are code packs that allow the application to communicate with external devices and applications. The plug-ins 302 allow for communication with network devices and appliances to occur with specific protocols and technologies necessary based on the application protocol interface (API) dictated by the external device. Each third party product has an available library of commands which they make available to call devices via an API.

Plug-ins 302 developed for the CoA Builder module are provided with commands that serve a purpose in cyber security or network management policies. All plug-ins 302 developed for one or more cyber security applications are delivered with at least one command. Plug-in commands generally correlate directly with a "task" that one would see in a standard operating procedure for security response. Therefore, for a plug-in associated with a firewall, a highly utilized command would be to block an IP Address. Different vendors may call the command something different. One may call it "block_IP" and another may call it "Block_IP," whereas another may use a ID number like "8012A". There is no standard naming convention from product to product, or from one vendor to another. When packaged in the CoA Builder platform, the plug-in commands are aliased to a common and easy to understand action, such as Block IP Address. Within the GUI, the alias would be displayed so the user can quickly understand the task and select it. Aliasing of commands is a technique used throughout the CoA Builder so users can quickly understand the content on the screen and proceed with their operation more efficiently and accurately.

A plug-in 302 is often related to a specific product, for example, a Cisco® ASA Firewall, Microsoft® Active Directory, or iSight Threatscape. As shown in FIG. 3, when a plug-in is selected, such as selected plug-in 304, an interface 306 may be provided to configure the selected plug-in 304. Each plug-in can have at least one command 308. As shown in FIG. 3, the commands button 308 is highlighted and a number of specific commands 312 associated with the selected plugin 304 are presented. Commands 308 are functions that can leverage an API to perform some kind of action on the network asset/device/appliance. Commands 308 are also incorporated in to CoA workflows as "tasks" performed within the CoA. Each command 308 may have a predefined set of input parameters 310 that are required for the plug-in command 312 to start/run. Each command can also have a predefined set of output parameters that are the result of the command running.

Figure 4:
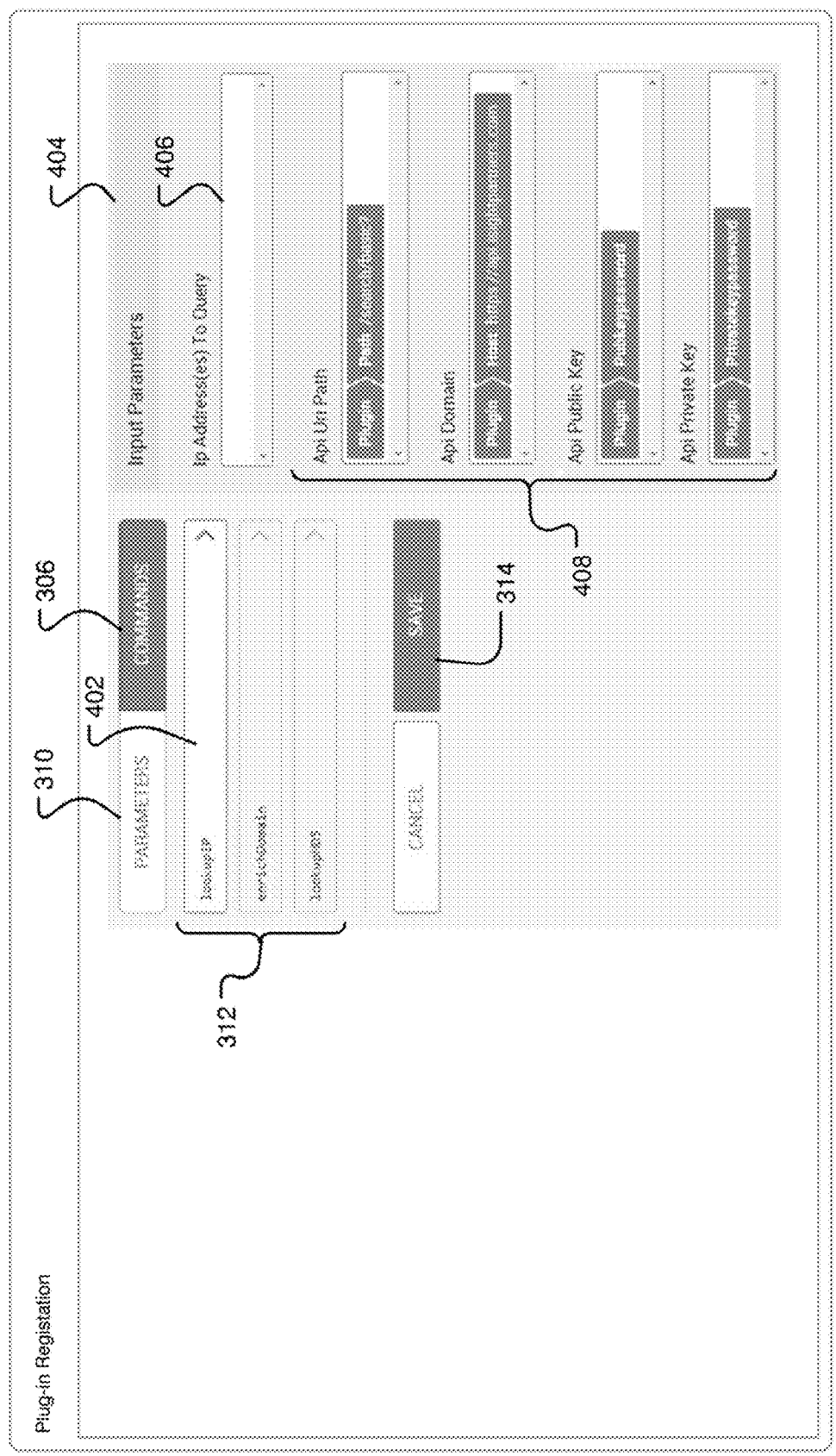

As shown in FIG. 4, upon selection of a specific command 402 from the list of commands 312, the particular input parameters 404 associated with the selected command 402 can be presented for review in a plug-in registration window 400 and possible population by the user. Alternatively, the user can select a separate parameters button 310 to review all of the parameters associated with the selected plug-in 304 directly, without reference to a particular command 312. Input parameters are tagged with a name or alias, as well as a type which indicates the kind of data required such as number, date, etc.

Some input parameters 408 may require population (e.g., device identification and password parameters), while other parameters 406 may either be populated at this time if the value is static or may instead be populated by output parameter data generated by an upstream task in a CoA. These output data elements can be consumed by tasks downstream in the workflow. The result of one task can become an input to the start of another task. This makes the process of building a CoA very simple. The abstracted parameters create interoperability between disparate devices within the network and security system of an organization.

Organizations may have more than one instance of a particular product or device. These instances can each have discrete configurations based upon, for example, differences in model number, port, IP address, or other network location and specific password information to access the device. Each instance is considered a device which may be registered as further described below and stored in a section of the library 300, accessible through the GUI by selecting the device section tab 318. Similarly, start nodes or "adapters" once configured and saved may be accessed from a section of the library 300 through the GUI by selecting the device section tab 320.

Figure 5:
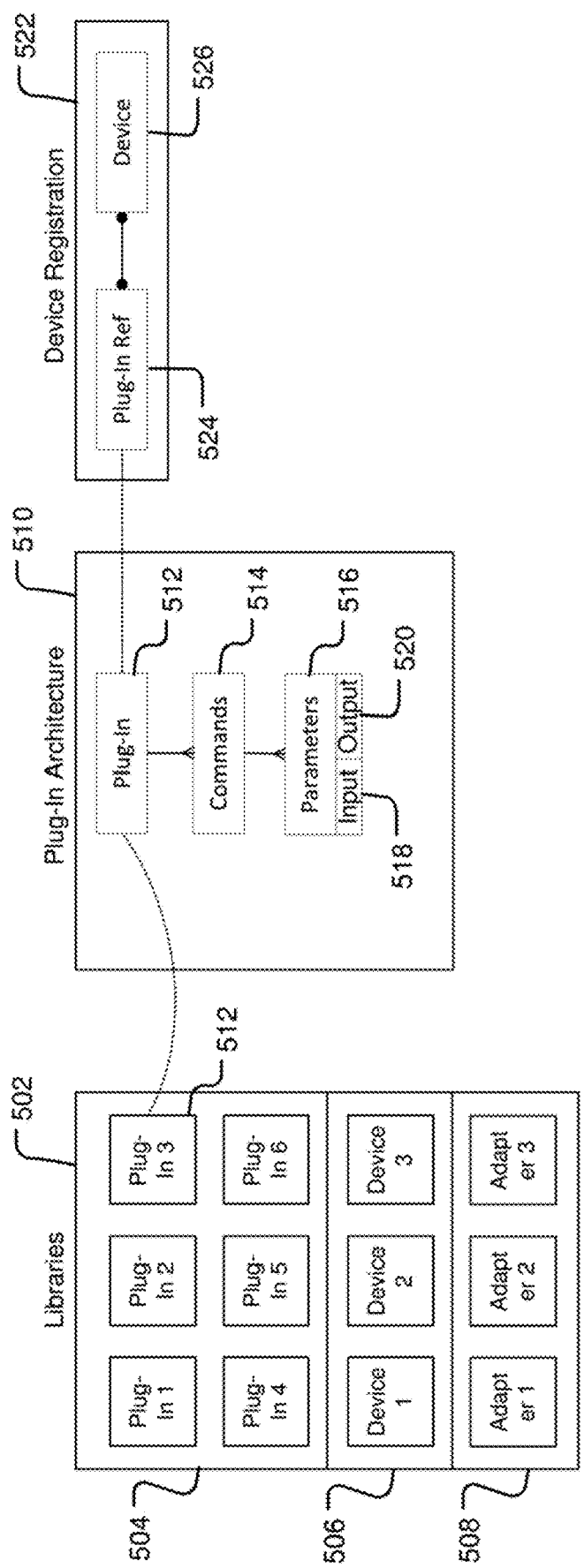
FIG. 5 is a schematic diagram of a process for registration of network device interface plugins with network devices.

The library 300 and functionality of interface 306 in FIGS. 3 and 4 is also shown schematically in FIG. 5. The library 502 may have sections for storage of plug-ins 504, devices 506 (i.e., an instantiation of a plug-in configured for a particular device), and adapters 508 (i.e., specific trigger conditions to be used as start nodes in a CoA). These library sections correspond to the tabbed display windows 316, 318, and 320, respectively, in FIG. 3. Each plug-in 512 in the library 504 has a specific plug-in architecture 510 including one or more commands 514 that the plug-in 512 can instantiate to activate or configure a type of network appliance. The commands 514 are built to interface with the API of the specific network appliance to be controlled by a task in a CoA. Each command 514 has associated parameters 516 including input parameters 518 needed to populate the command 514 to perform and action and output parameters 520 that may be generated by the network device after completion of the tasked action and returned to the plugin through the API for further use in the CoA. The output parameters 520 of one command may be used as input parameters 518 for other commands triggered by downstream tasks in the CoA.

Device specific input parameters 518 may include model number, port, IP address, or other network location. Once a plug-in 512 is configured with information specific to a particular device, a device 526 is then registered and the device registry information 522 is stored in a device section 506 of the library 502. The device registry information 522 includes the device identification parameters and a reference pointer 524 to the plug-in 512 used to control the functionality if that specific device. Note that parameters 416 for commands 414 associated with a particular type of plug-in 512 does not have to be stored with each instantiation of a device 526.

Returning to FIG. 2, once the plug-ins have been configured, a user can begin to develop a CoA using the CoA Builder GUI module. The CoA Builder can visually depict the flow of tasks that occurs, and also account for workflow elements such as the following: trigger and start conditions; branching and decision logic; parallel processing of tasks; e-mail notification with templates; recommended tasks; extended wait tasks; scheduled tasks; assignment, escalation and user workflow; and looping. In some implementations, these exemplary tasks include input and output parameter definitions. Each one can be simplified by displaying parameters when configuring.

Figure 6B:
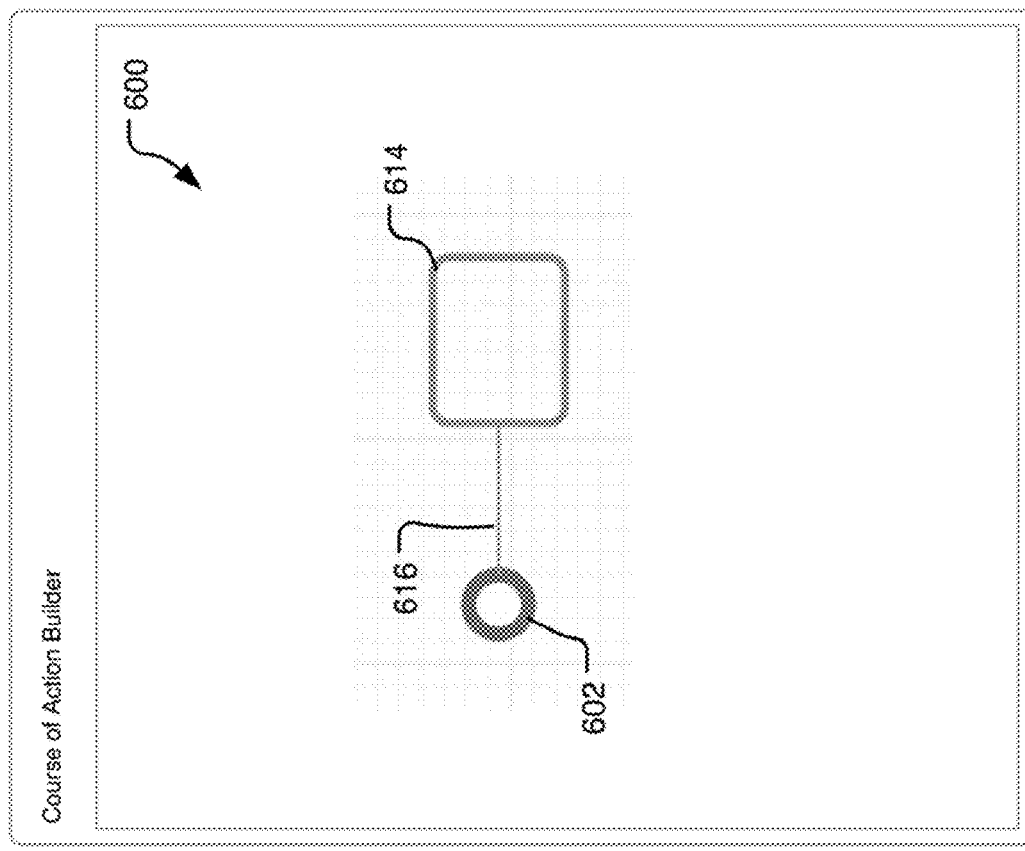
FIG. 6B is an exemplary screenshot of a workflow palate provided by a graphical user interface in a course of action builder with a start node and an initial task
Figure 6A:
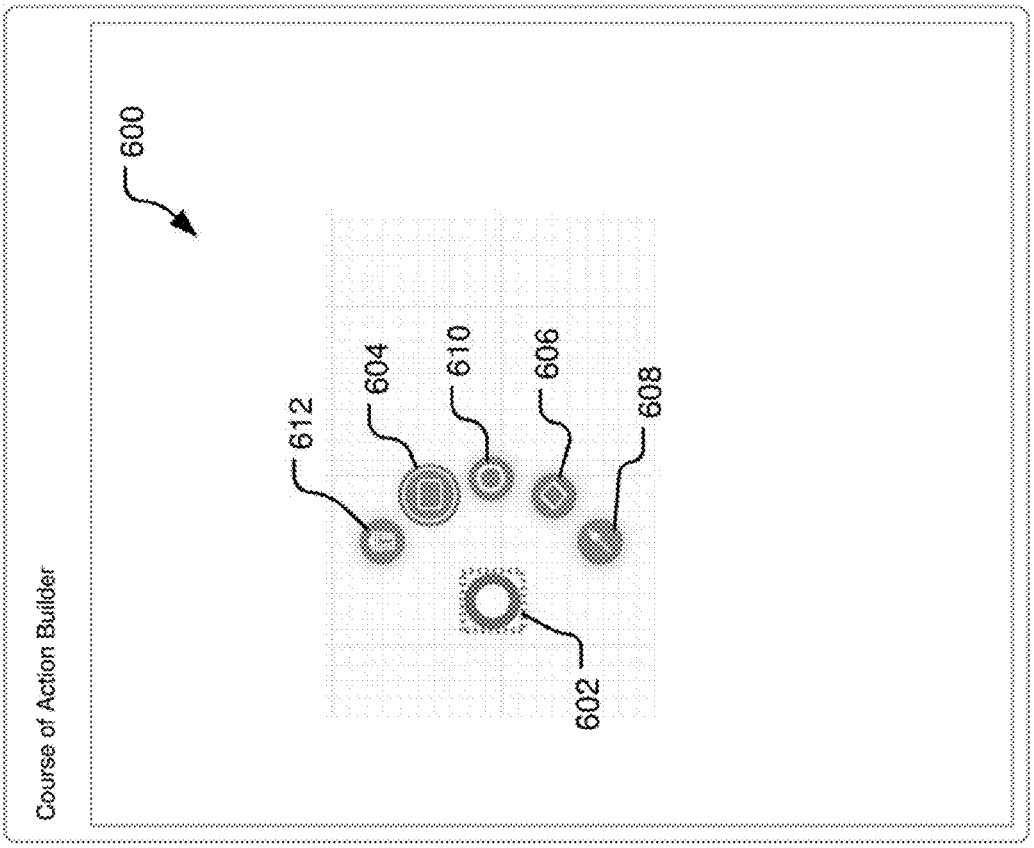
FIG. 6A is an exemplary screenshot of a workflow palate provided by a graphical user interface in a course of action builder with an array of stencil icons.

The CoA Builder module initially presents a workflow palate with task icons as indicated in operation 204. An exemplary implementation of a workflow palate 600 is presented in FIGS. 6A and 6B with a number of stencils (also referred to herein as "task stencils", or "objects") available to a user to build a CoA. As indicated in FIG. 6A, a start node 602 representing a selected adapter from the adapter library is provided on the palate 600. Alternatively, the start node 062 could be blank and configured from the palate stencil by selection. When a configured start node 602 is selected on the palate 600, a number of other stencil options may appear to assist the user in building a course of action. These stencils may include the following: a task stencil 604, a path toll stencil 606, a gateway stencil 608, a delete stencil 610, and an end node stencil 612.

As shown in FIG. 6A, the task stencil 604 is under consideration for selection (e.g., the user's computer mouse or other pointer may be hovering over the stencil). Initial selection of a particular stencil may be indicated by a change in appearance of the selected stencil. For example, as shown, the task stencil 604 is larger than the other stencils and is circumscribed by an annular ring. Upon completion of stencil selection, for example, the task stencil 604, all of the stencils may disappear from the palate 600 and a workflow instantiation of the selected stencil may be automatically connected to the prior workflow element by a path. This is shown in FIG. 6B wherein an instantiation of a task 614 is presented in the GUI linked to the start node 602 by a path 616. The user may drag the task 614 (or any other workflow element) to any position on the screen to best present and visualize the CoA workflow. The path 616 can automatically follow the task 614 regardless of where it is placed and maintain the connection with the start node 602. A user can independently select the path 616 to change its connection points and associations.

In addition to the task stencil 604, in this exemplary implementation a user can select a gateway 606 to place in the middle of a path to split the path, e.g., to build two or more different tasks to operate in parallel ingesting the same input parameter data. The gateway stencil 608 can also be used to place a gateway to rejoin two independent paths. The path stencil 608 may be used to draw additional flow paths between gateways, tasks, and nodes. The paths may further be conditional, i.e., the paths may be configured with decisions or conditions that can be met before the CoA continues down that path, e.g., a parameter value meets a certain threshold.

Figure 7:
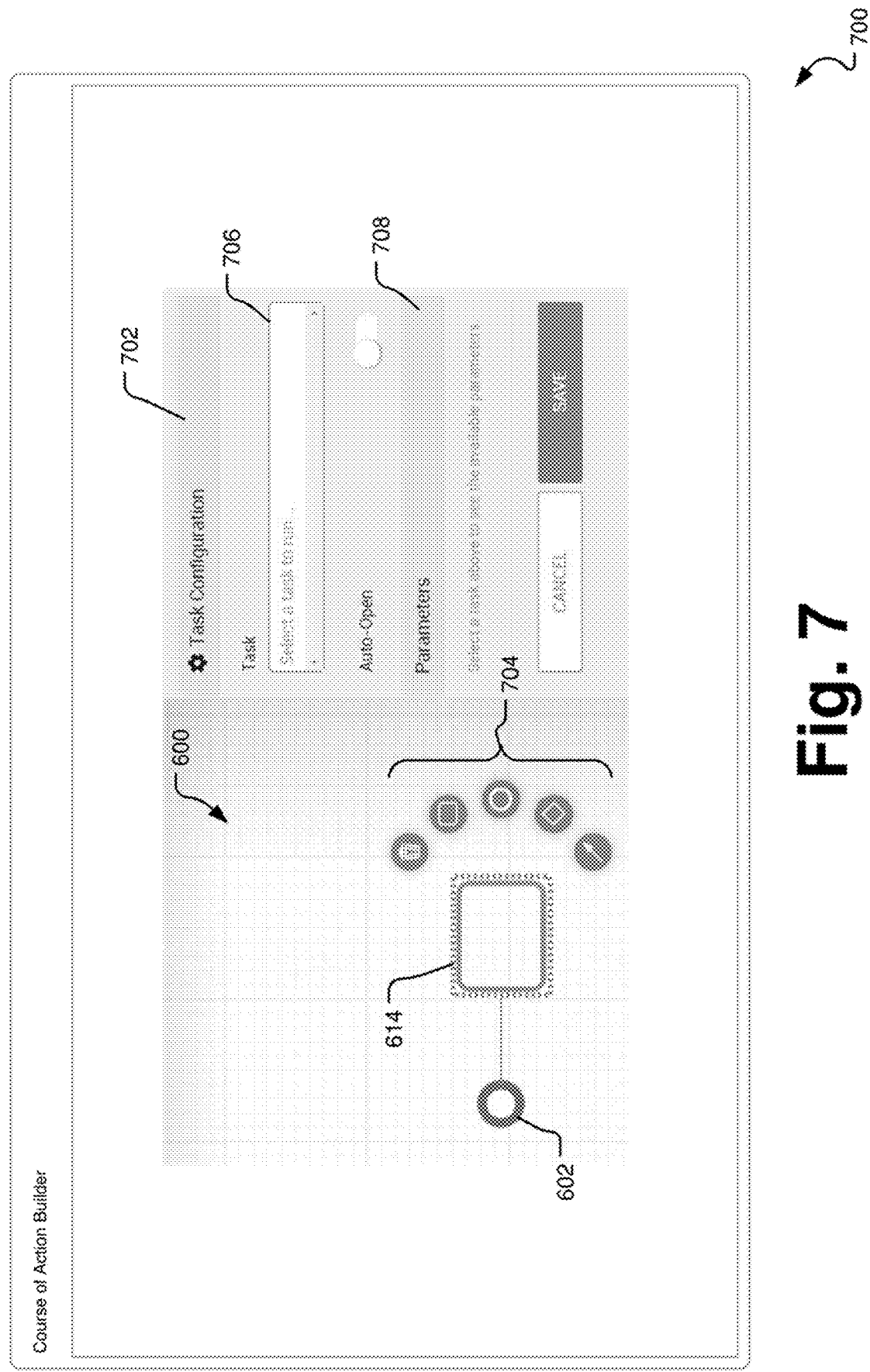
FIG. 7 is an exemplary screenshot of a task configuration window opening within the workflow plate to provide an interface for configuring the task.

The palate 600 may also include an end node stencil 610 that can be used to place an end node in along a particular flow path, e.g., after the completion of a task or of a series of tasks, to indicate the end of the CoA. In addition, the palate 600 may provide a delete stencil 612. Selection of the delete stencil 612 can delete the workflow element selected and immediately preceding the stencil array. For example, in FIG. 6A, the start node 602 is selected, thus causing the stencil array to appear. If the delete stencil 612 is selected at this time, the start node 602 would be deleted from the palate 600. Similarly, as shown in FIG. 7, the task 614 has been selected and the stencil array 704 is presented by the GUI of the CoA Builder module. If the delete stencil were selected from the stencil array 704 at this point, the task 614 would be deleted from the palate 600.

As shown in FIG. 7, the task stencil 614 is selected. In addition to the presentation of the stencil array 704 in the GUI, a task configuration window 702 is presented to associate a plug-in, a command, and necessary input parameters with the task 614. The steps of configuring a task in this manner are indicated in FIG. 2. When the task box 706 is selected in the task configuration window 702 in FIG. 7, the configuration process begins as indicated in FIG. 2 with the provision of plug-in selections in operation 206. This operation is further represented in FIG. 8 which depicts a plug-in selection list 802. As indicated in operation 208 in FIG. 2, an API may be provided to access the command and parameter information directly from the master plug-in application associated with the device selected and pass agnostic field information to the CoA Builder to request selection of appropriate commands and input parameters needed to properly instantiate the plug-in in the context of the CoA.

Plug-Ins are delivered with pre-configured input and output parameter data. This can be modified in the plug-In configuration page described above with respect to FIGS. 3 and 4. Parameter definitions associated with the selected plug-ins can determine what data is actually available for configuration in the CoA Builder. This simplifies the user experience when configuring the CoA because in some situations, only a small portion of data are handled to find the right parameter for the task being configured, while in other situations, other data can be processed. A lot of data may be returned with each task execution and certain elements can be treated as "parameters" available for downstream consumption depending upon the input parameters needed by another plug-in associated with a downstream task in the CoA.

Figure 8:
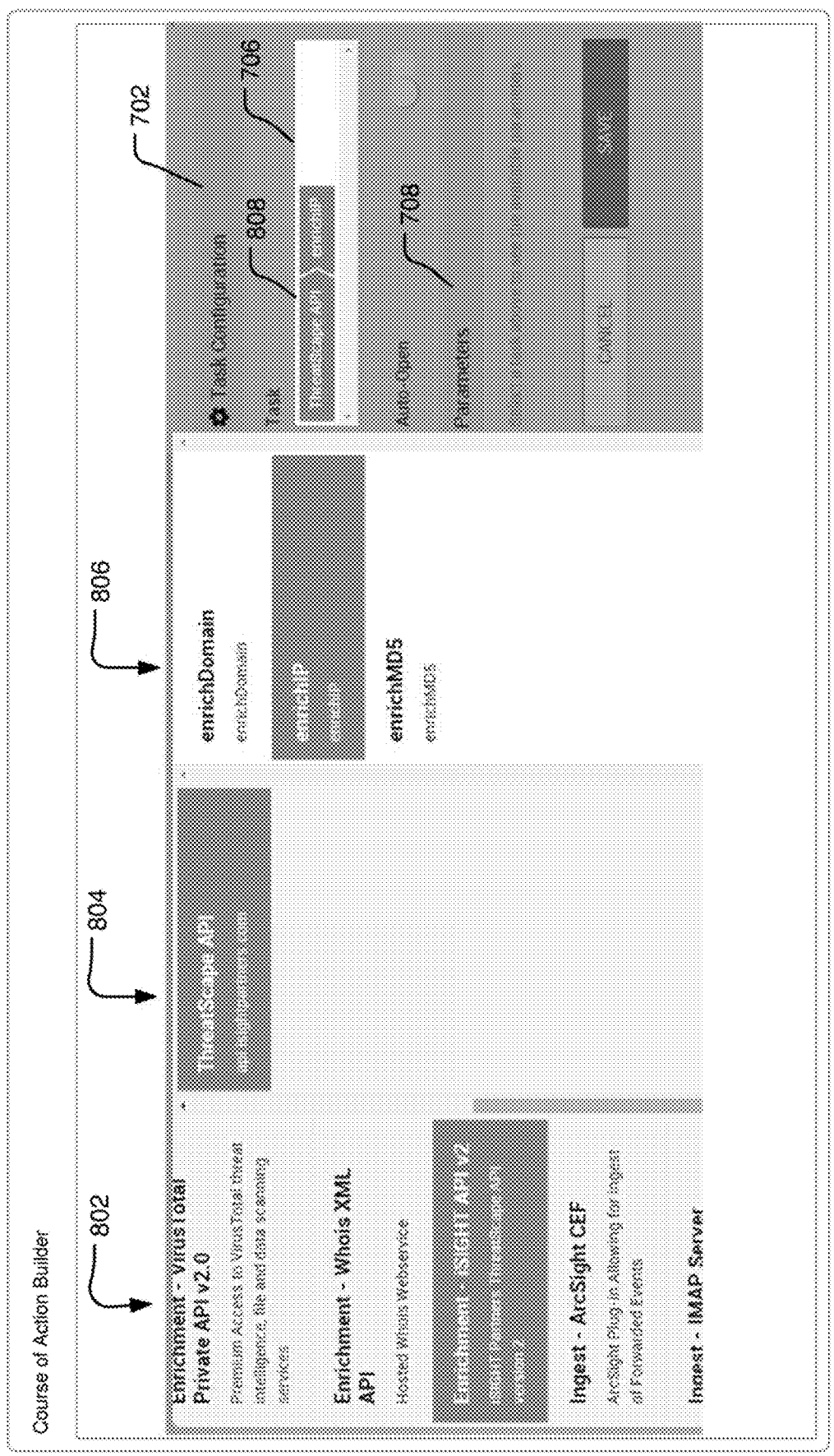
FIG. 8 is an exemplary screenshot of additional layers of the task configuration window of FIG. 7.

Recall that a plug-in may be associated with more than one device on the network. Therefore, when a plug-in is selected from the plug-in list 802 as indicated in FIG. 8, a further device list 804 of network devices registered with that plug-in is generated from all of the registered device plug-ins stored in the device library as indicated in operation 210 of FIG. 2. As previously noted, in some implementations, the device registrations do not include all of the information related to a plug-in, and can include the information specific to the device needed to identify and access the device. Further recall that the plug-ins may include multiple different command options and that each of the options may require different input parameters. Thus, as indicated in operation 212 of FIG. 2, the CoA Builder provides a command list 806 of commands associated with the plug-in for the selected device as indicated in FIG. 8. Once a command is selected from the command list 806, the task box 706 is populated by a shorthand command string 808 of the selected plug-in and command for the task 614.

Figure 9A:
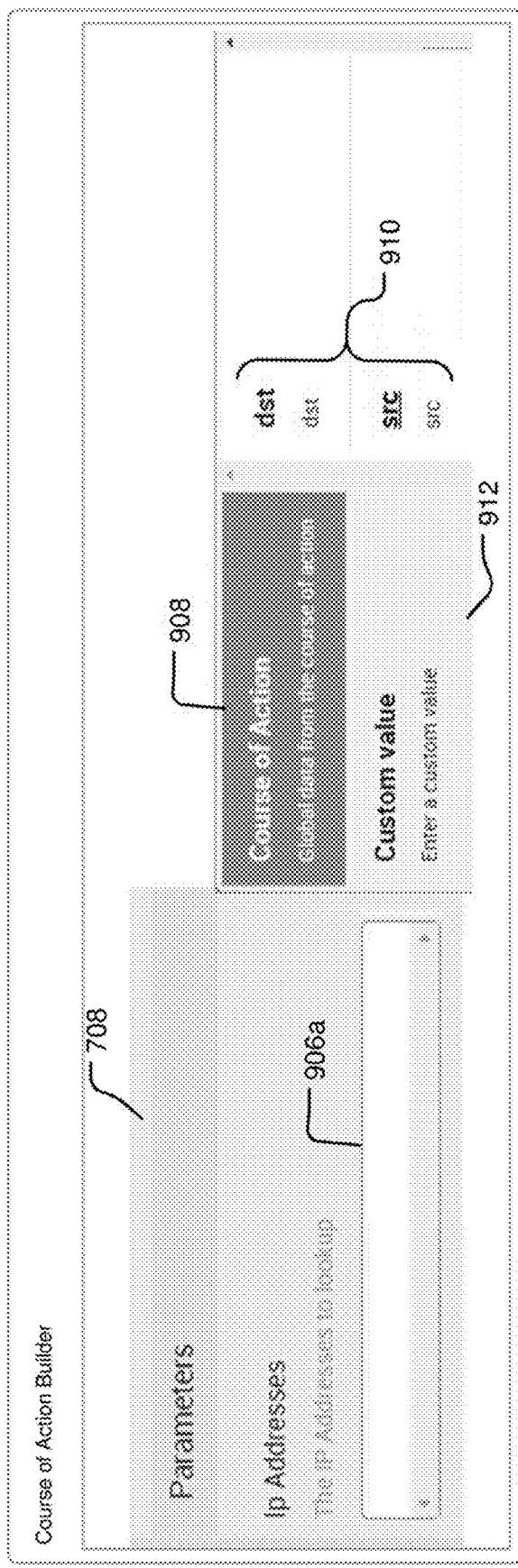
FIG. 9A is an exemplary screenshot of a parameter selection element of the task configuration window of FIG. 7.

Based on the command selected, the CoA Builder can provide a selection of input parameters available to execute the command as indicated in operation 214 of FIG. 2 and graphically represented in the GUI of FIG. 9A in which the parameters section 708 of the task configuration window 702 becomes active. The input parameters are specific to the command, and predefined at the plug-in command configuration level. The user may select the parameter values to input. As indicated in operation 216 of FIG. 2 there may be options for selection of a parameter value. Specifically, in this exemplary implementation, the input parameter for the present command may be selected from output parameters generated from tasks previously executed upstream in the workflow or the values may be custom input by the user. These options are indicated in the flow diagram of FIG. 2 and graphically presented in the GUI presentations of FIGS. 9A and 9B.

The CoA Builder abstracts, categorizes, tags, and filters all the potential parameters within the instant CoA that could be selected for each input parameter to the new command as provided in operation 218 of FIG. 2. Pertinent parameters can be available for selection; other data can be filtered out as indicated in operation 220. When mapping tasks within the CoA Builder, each subsequent task can request input data (a parameter) that it can use to process its related command. Without this specification much control and flexibility to the system is lost. When executing a task or plug-in command, s some of the data can be used in decision making and downstream task management, while other data will not be so used. Most of the data is erroneous to the processing needs of the CoA. For example, a task to pull a reputation of an IP address, to then make a decision based on that score may be executed. The decision may be to permanently block the IP address or put it on a temporary block. Embodiments here describe a sophisticated technique of allowing the configuration to occur, while keeping it simple to the user.

The CoA Builder interface can, in some situations, make data elements available as input parameters that are already predetermined to be essential to consumption by the remainder of the flow. It does not make all the data returned via a command available for selection because most of it is erroneous. This subsequent experience simplifies the design achieved with the CoA Builder GUI and benefits the user. Users do not need to sift through rows of data to pick out the important data and map it to the next step. In some cases there can be one option and the single parameter can be pre-selected as an input to a task. In other cases there can be more than one option, and the list for selection as input can represent a small percentage of the overall data transmitted through the entire CoA.

Figure 9B:
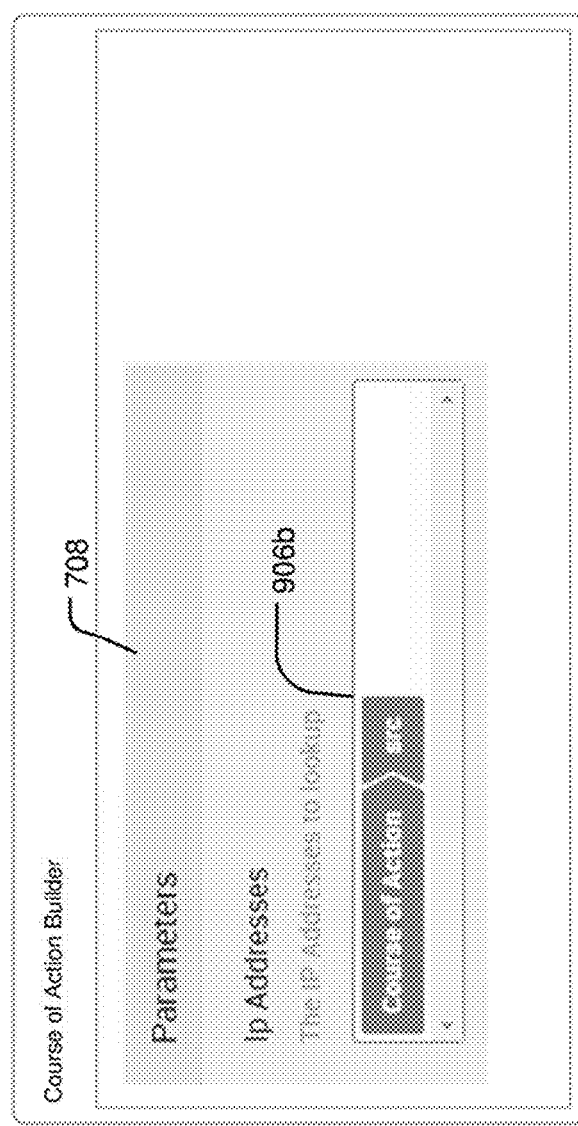
FIG. 9B is an exemplary screenshot of a completed parameter selection of the task configuration window of FIG. 7.

The screenshot in FIG. 9A illustrates this functionality. The lookup box 906a under the parameters section 708 has been limited to parameter values having IP addresses. This can be the type of input parameter used for the command string 808 in the task box 706. As shown, the available parameters for the previously selected command based upon all output parameters previously generated or otherwise available in this sample course of action 908 have been distilled to two parameters 910. In this case, the parameters are IP addresses (e.g., a destination IP address or a source IP address) as noted. Once selected, the source and type of the parameter selected are represented in a shorthand data string in the lookup box 906b as shown in FIG. 9B.

This means the data selection process is much simpler and less error prone. For example, if a task requires an input type of "date", then only parameters that are of type "date" can show up in the selection panel. As another example, if a task requires an input type of "IP address", then only parameters that are of type "IP Address" can show up in the selection panel. If the user does not see a particular data element desired for use as an input, this may indicate a need to incorporate a new task before the present task so that the needed data is available. Such reorganization, modification, and addition of tasks is easy because of the drag and drop functionality of the palate and the parameter definition associated with each task, which is served up to the GUI via a CoA Builder application protocol interface (API), which is used to pull information from the plug-in registration tables up to the CoA builder GUI.

The CoA Builder module can also allow for simple incorporation of additional parameters not previously defined by an upstream plug-in task. A "custom" parameter can be incorporated as indicated in operation 222 in FIG. 2. The option of providing a custom parameter is shown in FIG. 9A as a custom value selection option 912. This value would be hard coded rather than selecting a CoA parameter which would be more contextual to the specific security incident being remediated. As indicated in FIG. 2, once the parameter values have been selected, the configured task is saved in the CoA workflow, e.g., as an XML file, as indicated in operation 224.

Once a task is configured, all output parameter information is referenced as part of the CoA as well, as indicated in operation 226, and is made available to any downstream tasks in the CoA when configuring those tasks. The output parameters are pre-determined based on plug-in command setup. The output parameters are the data available to downstream CoA tasks to incorporate in to either inputs to their commands or condition statements for evaluation and path determination. The result of one task becomes an input to the start of another task.

An integral piece to the CoA Builder module is the normalization and simplification of data within the task, which is one level deeper than the data aliasing described in the previous section. This creates interoperability between different devices by linking the output parameters of one plug-in to input parameters of another. The CoA API normalizes and serves the data up into the XML data layer underlying the user interface to simplify this process. The CoA API is designed to pull information from the plug-in registration tables. When doing so it pulls and maintains in memory all the available output parameters for configured tasks. When configuring a new task, the input parameters for that task as well as their type are also known. The CoA API filters and displays only the output parameters that are of the correct type for input in to the input parameter of the new task.

Figure 10:
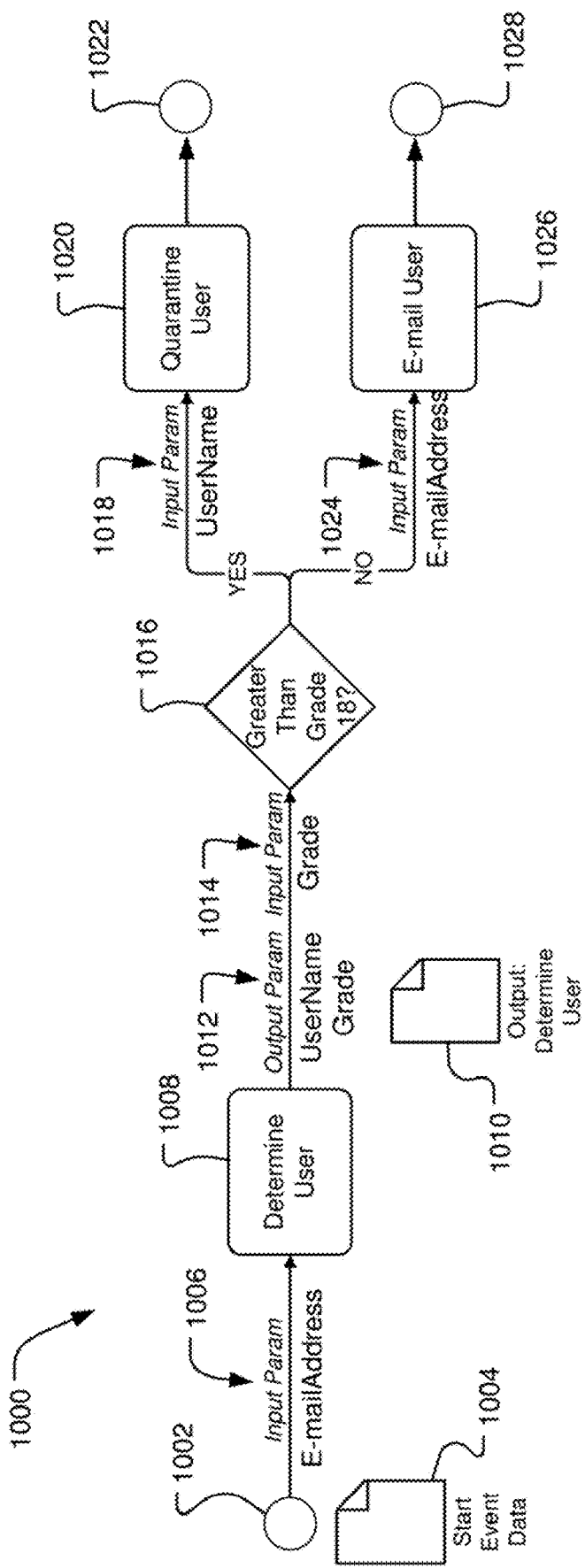
FIG. 10 is an exemplary course of action workflow created with the course of action builder graphical user interface.

FIG. 10 is a flow diagram of an exemplary CoA 1000 presented on a workflow palate that may be executed in by the Orchestration Engine to screen a potentially suspicious e-mail based upon the qualities of the proposed recipient. The CoA 1000 begins at a start node 1002 which includes a Start Event Data file 1004 for populating the tasks and conditions in the CoA 1000. The start event data 1004 may include significantly more data or parameters than is made available to the user when building the CoA 1000 in the GUI. As noted above, the CoA Builder filters the data stored within the CoA 1000 and presents the relevant data usable by a command underlying a task for selection during the construction of the CoA 1000. In this CoA 1000, the first task is to determine the identity of a network user addressee of an e-mail as represented by the determine user task 1008. To perform this function, the determine user task 1008 can have a single input parameter 1006, namely the E-mailAddress of the user. The command underlying the determine user task 1008, via the Orchestration Engine, instantiates the appropriate plug-in (e.g., an interface with the enterprise electronic mail system), which is able to determine and return the recipient user name and other significant data about the user, which is represented by the Output: Determine User data file 1010.

However, the CoA 1000 "knows" that the data needed from the Output: Determine User data file 1010 for potential downstream tasks in the CoA 1000 are output parameters 2012 for UserName and Grade. These two output parameters 1012 are thus the parameters passed through the remaining workflow.

A gateway element 1016 is the next activity in the CoA 1000. The gateway element 1016 is conditioned to determine whether the user recipient of the e-mail message is "greater than grade 18" in a grade structure in the organization. To determine the grade level, the input parameter 1014 provided to the gateway element 1016 is limited to the Grade data output as a parameter from the first task 1008. If the determination is that the user recipient is above grade 18, the path diverts to a quarantine user task 1020. The input parameter 1018 for the quarantine user task 1020 is one of the output parameters 1012 from the determine user task 1008. In this instance, because of the high grade level of the possible user recipient (e.g., a user with a high security clearance), the command underlying the quarantine user task 1020 actuates a plug-in associated with the e-mail server to prevent the potential recipient (the user) from receiving the e-mail. The CoA 1000 then terminates at end node 1022.

Alternatively, if the potential recipient user is below grade level 18, then transmitting an e-mail with a potential threat is determined to be an acceptable risk by the CoA 1000 process. Along this alternate path, an e-mail user task 1026 is provided to pass the e-mail in question to the user. The input parameter 1024 for the e-mail user task 1026 is the E-mailAddress value provided in the Start Event Data 1004 at with the start node 1002. The command underlying the e-mail user task 1026 actuates a plug-in associated with the e-mail server authorizing the e-mail server to send the e-mail to the user. The CoA 1000 then terminates at end node 1028.

The sample data interchange file structure presented below, for example, as a JSON file, is an exemplary representation of a single task. The task representation defines such things as operation sequence, next task, specific plug-in details referenced, and parameter configuration.

```
"deviceTasks" : [{
        "outgoing" :
        ["SequenceFlow__071enfy"], "incoming"
        : ["SequenceFlow__1cdsn3c"],
        "autoOpen" : False,
        "pluginId" : "be29eabb-59fb-4075-b987-13a37d2ede24",
        "deviceId" : "aa1164e6-740b-4cd5-b1cd-f55b3816676e",
        "commandId" : "98a29a08-2e2e-434c-abb5-
        94b659fcccd6",
    "output" : { },
    "input" : {|
        "parameters" : [{
            "value" : {
                "type" : "emailAddress | String",
                "value" : "${COA.emailAddress}"
            },
        }]
    "description" :
    "DetermineUser" "id" :
    "Task__08m97fy"
```

Each task within a CoA would be represented in a similar manner as depicted above.

The several tags and corresponding values in the exemplary task file are explained further as follows:

(1) The "outgoing" string defines the next step in the path of the CoA. If there is more than one path leading outbound from this task, then multiple outgoing values would be defined.

(2) The "incoming" string defines a previous task that can call this task. If there is more than one path leading inbound to this task, then multiple incoming values would be defined.

(3) The "commandId" string identifies the command ID for specific operation (possibly out of several) provided by a plug-in that relates to this task.

(4) The "pluginId" string identifies the ID for the plug-in being used in this task.

(5) The "deviceId" string identifies the specific device instantiation of a plug-in for this task.

(6) The "output" string lists any custom defined output parameters for this task file. Output parameters are otherwise defined in the plug-in command itself and not saved in the JSON.

(7) The "input" string defines the configuration of input parameters for the task commands to use when run.

(8) The "parameter" section stores each of the input parameters required for input to run the task commands.

(9) The "type" string defines the type of data required for input.

(10) The "value" string defines the location of the value to be input, either from the CoA or a custom value manually input.

(11) The "description" and "id" identify the specific task name and identifier within the CoA.

The Orchestration Engine is able to consume the format and recognize exactly what plug-in operations to execute, in what sequence, and where to locate the data need to execute the task.

An exemplary special purpose computer system 1100 for implementing the CoA Builder module and related processes above is depicted in FIG. 11. The computer system 1100 of user of the CoA Builder may be a personal computer (PC), a workstation connected with a server, a notebook or portable computer, a tablet PC, a handheld media player (e.g., an MP3 player), a smart phone device, or other device with internal processing and memory components as well as interface components for connection with external input, output, storage, network, and other types of peripheral devices. Internal components of the computer system in FIG. 11 are shown within the dashed line and external components are shown outside of the dashed line. Components that may be internal or external are shown straddling the dashed line. Alternatively to a PC, the computer system 1100 instantiating the CoA Builder application may be in the form of any of a server, a mainframe computer, a distributed computer, an Internet appliance, or other computer devices, or combinations thereof.

In any embodiment or component of the system described herein, the computer system 1100 includes a processor 1102 and a system memory 1106 connected by a system bus 1104 that also operatively couples various system components. There may be one or more processors 1102, e.g., a single central processing unit (CPU), or a plurality of processing units, commonly referred to as a parallel processing environment (for example, a dual-core, quad-core, or other multi-core processing device). The system bus 1104 may be any of several types of bus structures including a memory bus or memory controller, a peripheral bus, a switched-fabric, point-to-point connection, and a local bus using any of a variety of bus architectures. The system memory 1106 includes read only memory (ROM) 1108 and random access memory (RAM) 1110. A basic input/output system (BIOS) 1112, containing the basic routines that help to transfer information between elements within the computer system 1100, such as during start-up, is stored in ROM 1108. A cache 1114 may be set aside in RAM 1110 to provide a high speed memory store for frequently accessed data.

A memory drive interface 1116 may be connected with the system bus 1104 to provide read and write access to a non-volatile data storage device 1118, e.g., a hard disk drive or solid state drive, for nonvolatile storage of applications, files, and data. A number of program modules and other data may be stored on the data storage device 1118, including an operating system 1120, one or more application programs 1122, and data files 1124. In an exemplary implementation, the hard disk drive 1118 may store the course of action builder module 1164, the orchestration engine 1166, the network device plug-ins and related APIs 1168, and the libraries 1170 and related data, e.g., of courses of action, plug-in commands and associated parameters, device registrations, etc. Note that the data storage device 1118 may be either an internal component or an external component of the computer system 1100 as indicated by the data storage device 1118 straddling the dashed line in FIG. 11. In some configurations, there may be both an internal and an external data storage device 1118.

The computer system 1100 may further include an external memory drive 1130 for reading from or writing to a removable magnetic disk 1132, tape, or other magnetic media, or solid state media such as flash memory. Additionally or alternatively, an optical disk drive 1136 for reading from or writing to a removable optical disk 1138 such as a CD ROM or other optical media may be included in the computer system 1100. The external memory drive 1130 and optical disk drive 1136 may be connected with the system bus 1104 via an external storage interface 1128 to provide read and write access to the external memory drive 1130 or the optical disk drive 1136 initiated by other components or applications within the computer system 1100. The magnetic disk drive 1130 and optical disk drive 1136, and the associated computer-readable media, may be used to provide nonvolatile storage of computer-readable instructions, data structures, program modules, and other data for the computer system 1100.

A display device 1142, e.g., a monitor, a television, or a projector, or other type of presentation device may also be connected to the system bus 1104 via an interface, such as a video adapter 1140 or video card. Similarly, audio devices, for example, external speakers or a microphone (not shown), may be connected to the system bus 1104 through an audio card or other audio interface (not shown).

In addition to the monitor 1142, the computer system 1100 may include other peripheral input and output devices, which are often connected to the processor 1102 and memory 1106 through the serial port interface 1144 that is coupled to the system bus 1106. Input and output devices may also or alternately be connected with the system bus 1104 by other interfaces, for example, a universal serial bus (USB), an IEEE 1394 interface ("Firewire"), a parallel port, or a game port. A user may enter commands and information into the computer system 1100 through various input devices including, for example, a keyboard 1146 and pointing device 1148, for example, a mouse. Other input devices (not shown) may include, for example, a stylus pad, a joystick, a game pad, a tablet, a touch screen device, a satellite dish, a scanner, a facsimile machine, a microphone, a digital camera, and a digital video camera.

Output devices may include a printer 1150 and one or more loudspeakers 1170. Other output devices (not shown) may include, for example, a plotter, a photocopier, a photo printer, a 3-D printer, a facsimile machine, and a press. In some implementations, several of these input and output devices may be combined into single devices, for example, a printer/scanner/fax/photocopier. It should also be appreciated that other types of computer-readable media and associated drives for storing data, for example, magnetic cassettes or flash memory drives, may be accessed by the computer system 1100 via the serial port interface 1144 (e.g., USB) or similar port interface.

The computer system 1100 may operate in a networked environment using logical connections through a network interface 1152 coupled with the system bus 1104 to communicate with one or more remote devices. The logical connections depicted in FIG. 11 include a local-area network (LAN) 1154 and a wide-area network (WAN) 1160. Such networking environments are commonplace in home networks, office networks, enterprise-wide computer networks, and intranets. These logical connections may be achieved by a communication device coupled to or integral with the computer system 1100. As depicted in FIG. 11, the LAN 1154 may use a router 1156 or hub, either wired or wireless, internal or external, to connect with remote devices, e.g., a remote computer server 1158 or network appliance devices 1157 (e.g., routers, firewalls, etc.) similarly connected on the LAN 1154. For example, in the context of the present application, the Orchestration Engine 1166 operating on the special purpose computer 1100 to execute a course of action can communicate instructions or actions from a plug-in identified in a task over the LAN 1154 to such network appliance devices 1157 to mitigate a cyber security threat on the LAN 1154. The remote computer 1158 connected via the LAN 1154 may be another personal computer, a laptop, a tablet, a smartphone, a server, a client, a peer device, or other common network node, and typically includes many or all of the elements described above relative to the computer system 1100.

To connect with a WAN 1160, the computer system 1100 typically includes a modem 1162 for establishing communications over the WAN 1160. Typically the WAN 1160 may be the Internet. However, in some instances the WAN 1160 may be a large private network spread among multiple locations, or a virtual private network (VPN). The modem 1162 may be a telephone modem, a high speed modem (e.g., a digital subscriber line (DSL) modem), a cable modem, or similar type of communications device. The modem 1162, which may be internal or external, is connected to the system bus 1104 via the network interface 1152. In alternate embodiments the modem 1162 may be connected via the serial port interface 1144. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools.

Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
receiving, at a graphical user interface implemented by one or more processors, from a user a selection of a first task stencil from a plurality of task stencils and a second task stencil from the plurality of task stencils, each task stencil from the plurality of task stencils representing a task from a plurality of tasks, the first task stencil graphically representing a first task from the plurality of tasks, the second task stencil graphically representing a second task from the plurality of tasks, the plurality of tasks associated with responses executable by a plurality of network devices to a security event, the plurality of network devices operatively coupled to the one or more processors via a computer network;
receiving, at the graphical user interface, from the user (1) a selection of a first plug-in module from a plurality of plug-in modules, the first plug-in module being associated with the first task, and (2) a selection of a second plug-in module from the plurality of plug-in modules, the second plug-in module being associated with the second task, each plug-in module from the plurality of plug-in modules associated with at least one network device from the plurality of network devices;
associating a first activation command of the first plug-in module with the first task and a second activation command of the second plug-in module with the second task;
generating a workflow including the first activation command associated with a first network device from the plurality of network devices and the second activation command associated with a second network device from the plurality of network devices and in an order relative to the first activation command, input data associated with the second activation command associated with output data from the first activation command; and
sending the first activation command to the first network device for execution in response to the security event and the second activation command to the second network device for execution in response to the security event.

2. A system, comprising:
a memory; and
a processor operatively coupled to the memory, the processor configured to:
receive, at a graphical user interface, from a user a selection of a first task stencil from a plurality of task stencils and a second task stencil from the plurality of task stencils, each task stencil from the plurality of task stencils representing a task from a plurality of tasks, the first task stencil graphically representing a first task from the plurality of tasks, the second task stencil graphically representing a second task from the plurality of tasks, the plurality of tasks associated with responses executable by a plurality of network devices to a security event, the plurality of network devices operatively coupled to the processor via a computer network;
receive, at the graphical user interface, from the user (1) a selection of a first plug-in module from a plurality of plug-in modules, the first plug-in module being associated with the first task, and (2) a selection of a second plug-in module from the plurality of plug-in modules, the second plug-in module being associated with the second task, each plug-in module from the plurality of plug-in modules associated with least one network device from the plurality of network devices;
associate a first activation command of the first plug-in module with the first task and a second activation command of the second plug-in module with the second task;
generate a workflow including the first activation command associated with a first network device from the plurality of network devices and the second activation command associated with a second network device from the plurality of network devices and in an order relative to the first activation command;
send the first activation command to the first network device for execution in response to the security event and the second activation command to the second network device for execution in response to the security event.

3. The method of claim 1, wherein:
each plug-in module from the plurality of plug-in modules is configured to interact with at least one network device from the plurality of network devices using application program interface (API) protocols associated with that corresponding plug-in module.

4. The method of claim 1, further comprising:
receiving, via the graphical user interface, from the user a selection of the first network device from a subset of network devices (1) associated with the first plug-in module and (2) of the plurality of network devices.

5. The method of claim 1, further comprising:
receiving, via the graphical user interface and prior to associating the first activation command with the first task, from the user a selection of the first activation command from a plurality of activation commands associated with the first plug-in module.

6. The method of claim 1, further comprising:
receiving, via the graphical user interface, from the user a selection of a start node stencil representing an adaptor, the adaptor being a condition, when satisfied, configured to trigger execution of the first activation command to respond to the security event to protect the computer network.

7. The method of claim 1, further comprising:
presenting the plurality of task stencils at the graphical user interface as representational elements having "drag and drop" features.

8. The method of claim 1, wherein the graphical user interface references a device table containing information regarding an association of the first network device with the first plug-in module and an association of the second network device with the second plug-in module.

9. The method of claim 1, wherein the first activation command includes at least one of an instruction to block an Internet Protocol (IP) address, or an instruction to activate a firewall.

10. The method of claim 1, further comprising:
receiving, via the graphical user interface, from the user a selection of an end node stencil graphically representing an end node of the workflow, the end node representing an end of the workflow.

11. The method of claim 1, wherein the sending the first activation command and the second activation command triggers execution of the first activation command and the second activation command in response to the security event to protect the computer network.

12. A non-transitory processor-readable medium storing code representing instructions to be executed by a processor, the code comprising code to cause the processor to:
receive, at a graphical user interface, from a user a selection of a first task stencil from a plurality of task stencils and a second task stencil from the plurality of task stencils, the first task stencil graphically representing a first task from the plurality of tasks, the second task stencil graphically representing a second task from the plurality of tasks, the plurality of tasks associated with responses executable by a plurality of network devices to a security event,
receive, at the graphical user interface, from the user (1) a selection of a first plug-in module from a plurality of plug-in modules, the first plug-in module being associated with the first task, and (2) a selection of a second plug-in module from the plurality of plug-in modules, the second plug-in module being associated with the second task, each plug-in module from the plurality of plug-in modules associated with at least one network device from the plurality of network devices;
associate a first activation command of the first plug-in module with the first task and a second activation command of the second plug-in module with the second task;
generate a workflow including the first activation command associated with a first network device from the plurality of network devices and the second activation command associated with a second network device from the plurality of network devices and in an order relative to the first activation command; and
send the first activation command to the first network device and the second activation command to the second network device to trigger execution of the first activation command and the second activation command to block or remediate the security event to protect a computer network.

13. The non-transitory processor-readable medium of claim 12, wherein:
each plug-in module from the plurality of plug-in modules is configured to interact with at least one network device from the plurality of network devices using application program interface (API) protocols associated with that corresponding plug-in module.

14. The non-transitory processor-readable medium of claim 12, wherein the code further comprises code to cause the processor to:
receive, via the graphical user interface, from the user a selection of the first network device from a subset of network devices (1) associated with the first plug-in module and (2) of the plurality of network devices.

15. The non-transitory processor-readable medium of claim 12, wherein the code further comprises code to cause the processor to:
receive, via the graphical user interface and prior to associating the first activation command with the first task, from the user a selection of the first activation command from a plurality of activation commands associated with the first plug-in module.

16. The non-transitory processor-readable medium of claim 12, wherein the code further comprises code to cause the processor to:
receive, via the graphical user interface, from the user a selection of a start node stencil representing an adaptor, the adaptor being a condition, when satisfied, configured to trigger execution of the first activation command to respond to the security event to protect the computer network.

17. The non-transitory processor-readable medium of claim 12, wherein the code further comprises code to cause the processor to:
present the plurality of task stencils at the graphical user interface as representational elements having "drag and drop" features.

18. The non-transitory processor-readable medium of claim 12, wherein the graphical user interface references a device table containing information regarding an association of the first network device with the first plug-in module and an association of the second network device with the second plug-in module.

19. The non-transitory processor-readable medium of claim 12, wherein the first activation command includes at least one of an instruction to block an Internet Protocol (IP) address, or an instruction to activate a firewall.

20. The non-transitory processor-readable medium of claim 12, wherein the code further comprises code to cause the processor to:
receive, via the graphical user interface, from the user a selection of an end node stencil graphically representing an end node of the workflow, the end node representing an end of the workflow.

21. The method of claim 1, wherein:
the first task is associated with the first network device; and
the second task is associated with the second network device.

22. The method of claim 1, further comprising:
presenting the workflow at the graphical user interface.

23. The method of claim 1, wherein:
the second activation command is executable by the second network device in the order in parallel with the first activation command executable by the first network device.

24. The method of claim 1, wherein:
the order in which the second activation command is executable relative to the first activation command is configurable by the one or more processors.

25. The method of claim 1, wherein:
the first network device is different from the second network device.

26. The method of claim 1, wherein:
the first network device is the same as the second network device.

* * * * *